United States Patent [19]

Sharir

[11] Patent Number: 5,770,092
[45] Date of Patent: Jun. 23, 1998

[54] APPARATUS AND METHOD FOR PURIFYING WATER

[75] Inventor: Eitan Sharir, Ashdod, Israel

[73] Assignee: Solar Dynamics Ltd., Ashdod, Israel

[21] Appl. No.: 815,830

[22] Filed: Mar. 12, 1997

Related U.S. Application Data

[63] Continuation-in-part of Ser. No. 459,544, Jun. 2, 1995, abandoned.

[30]    Foreign Application Priority Data

Jun. 15, 1994  [IL]  Israel ........................................ 110020

[51] Int. Cl.$^6$ ............................. B01D 33/04; B01D 36/04
[52] U.S. Cl. ........................ 210/738; 210/783; 210/804; 210/107; 210/113; 210/202; 210/207; 210/297; 210/312; 210/400; 210/739
[58] Field of Search ..................................... 210/702, 738, 210/783, 785, 791, 798, 804, 806, 202, 203, 205, 207, 259, 265, 266, 297, 298, 299, 300, 301, 307, 312, 391, 393, 396, 400, 408, 739, 107, 111, 113

[56]    References Cited

U.S. PATENT DOCUMENTS

| | | | |
|---|---|---|---|
| 2,173,256 | 9/1939 | Jordan | 210/393 |
| 2,361,283 | 10/1944 | Good | 210/738 |
| 2,413,375 | 12/1946 | Pomeroy . | |
| 3,353,679 | 11/1967 | Hirsch | 210/298 |
| 3,537,584 | 11/1970 | MacDonald et al. | 210/393 |
| 3,707,230 | 12/1972 | Davidson | 210/391 |
| 3,959,133 | 5/1976 | Fulton | 210/804 |
| 4,071,451 | 1/1978 | Wood | 210/111 |
| 4,078,129 | 3/1978 | Yamagata et al. . | |
| 4,110,209 | 8/1978 | Vogel . | |
| 4,136,031 | 1/1979 | Jokobsen | 210/297 |
| 4,145,288 | 3/1979 | Crowe | 210/111 |
| 4,309,291 | 1/1982 | Probstein et al. | 210/713 |
| 4,358,381 | 11/1982 | Takeuchi et al. | 210/727 |
| 4,505,397 | 3/1985 | Matthews | 210/804 |
| 4,707,272 | 11/1987 | Kistler | 210/709 |
| 4,855,065 | 8/1989 | Keeter et al. | 210/804 |
| 4,946,602 | 8/1990 | Ekberg et al. | 210/393 |
| 5,080,806 | 1/1992 | Balzano | 210/804 |
| 5,167,821 | 12/1992 | Tanbo et al. | 210/738 |
| 5,178,773 | 1/1993 | Kerlin et al. | 210/804 |

FOREIGN PATENT DOCUMENTS

| | | |
|---|---|---|
| 4028458 | 3/1992 | Germany . |
| 2172216 | 9/1986 | United Kingdom . |

*Primary Examiner*—Christopher Upton
*Attorney, Agent, or Firm*—Scully, Scott, Murphy & Presser

[57]    ABSTRACT

The invention provides a multi-stage apparatus for continuous waste water filtration, comprising a first tank provided with a waste water inlet pipe to supply waste water containing suspended solids to the tank, means for adding a coagulant to the waste water and an outlet pipe, a second tank receiving the mixture of waste water and coagulant from the outlet pipe, the second tank being sufficiently large to allow larger suspended solids to settle and being provided with a lower, openable port for discharge of the settled solids and having an upper weir for discharge of partially-cleared water, a continuously-driven, non-taut perforated belt, having a surface positioned to receive, at a first location, a stream of the discharged, partially-cleared water, the belt perforations being sized to enable the passage of clear water therethrough while retaining fine and coagulated solids on the surface for subsequent discharge at a second location, and the belt being non-taut to form a trough for retaining a body of water above the surface thereof, a load sensor in contact with the belt to determine the combined weight of the belt and the water retained thereon and to control a motor of the belt and the speed thereof as a function of the weight, whereby a microcake of less than 1 mm thickness of fine and coagulated solids is formed and retained on the surface of the belt thereby improving the filtering capacity of the belt, a water collection body being provided under the first location for water passing through the belt perforations, and a solids collection bin being provided at the second location, for collection of particles falling off the belt at the second location.

16 Claims, 4 Drawing Sheets

APPARATUS AND METHOD FOR PURIFYING WATER

The present specification is a continuation-in-part of U.S. application Ser. No. 08/459,544 filed Jun. 2nd, 1995, abn.

The present invention relates to an apparatus and method for purifying water.

More particularly, the present invention refers to the low-cost, multistage clarification of sewage and potable water and provides a solution to the problem of filter clogging, enabling continuous operation of said apparatus.

With the growth of human population and the increasing scarcity of fresh water, much effort has been devoted to the development of methods and apparatus for the purification of water which is unfit for irrigation, industry or domestic consumption. Said purification efforts are usually directed to sea water, brackish water, or sewage effluent.

While contaminated fresh water is not available in as unlimited quantities as is sea water, the purification thereof can be accomplished at lower cost, as suspended solids are more easily removed therefrom than are the 3.5% dissolved salts which are present in sea water. Furthermore, there are few locations where sewage effluent may be discharged without causing some pollution problem. A plant effectively treating such effluent will produce usable water along with a fertilizer or animal feed product, and will prevent the pollution of ground water or of the seashore.

Clarification, the first step in a waste water purification process, usually requires at least one filtering step. Filters which are in intensive use must either be periodically cleaned or replaced to prevent clogging. Replacement is a viable option in applications where only small quantities of solids are removed, for example, in oil filters used in industrial and automotive applications. However, filter cleaning is required in large scale applications, such as water purification. Even if a cheap, abundant filter medium such as sand is used, its replacement is labour-intensive, and there exists a disposal problem for the contaminated medium. Furthermore, the filtered solid may have some value, either as is or after further processing, but said value is lost with disposal of the filter medium.

A common method of cleaning filters is to stop the filtering process and remove the filter for washing or processing through chemical or ultrasonic means.

Another method of cleaning filters involves the periodic reversal of filter flow, to dislodge and remove the accumulated sludge. Compressed air may be used for the same purpose, causing bubbling and discharge of solid particles into the fluid stream.

Settling tanks have the advantages of being non-clogging and requiring the least amount of energy for their operation, but such tanks require large land areas to be effective for all but the largest particles, and the process eventually has to be stopped to clear the tank. Settling tanks are not suitable for the removal of small particles, unless said particles are much heavier than the fluid from which they are to be removed.

Centrifuges, while considerably more costly to build and operate than settling tanks, are used to achieve filtering in a smaller land area than is possible with said tanks. Heavier than water solids are acted upon by centrifugal force; the solids press on the perforated centrifuge bowl wall which is lined with a filter medium, and the clarified water is withdrawn from the bowl center. The filter, however, frequently becomes clogged and needs replacement or cleaning.

The above-mentioned methods also suffer from the disadvantages that continuous water clarification is not achieved, and that large machines, such as air compressors and pumps using considerable energy for their operation, are required to achieve filter clearing.

It is one object of the present invention to provide an apparatus and a method for purification of waste or potable water, wherein continuous operation is achieved and the problem of filter clogging is avoided.

It is a further object of the present invention to provide an apparatus for the purification of waste water which is operated by machinery of moderate size, is reliable in operation, conserves energy, and may be constructed and operated at moderate cost.

The present invention achieves the above objectives by providing a multi-stage apparatus for continuous waste water filtration, comprising: a first tank provided with a waste water inlet pipe to supply waste water containing suspended solids to said tank, means for adding a coagulant to said waste water and an outlet pipe;

a second tank receiving said mixture of waste water and coagulant from the outlet pipe, said second tank being sufficiently large to allow larger suspended solids to settle and being provided with a lower, openable port for discharge of said settled solids and having an upper weir for discharge of partially-cleared water;

a continuously-driven, non-taut perforated belt, having a surface positioned to receive, at a first location, a stream of said discharged, partially-cleared water, the belt perforations being sized to enable the passage of clear water therethrough while retaining fine and coagulated solids on said surface for subsequent discharge at a second location, and said belt being non-taut to form a trough for retaining a body of water above the surface thereof;

a load sensor in contact with said belt to determine the combined weight of said belt and the water retained thereon and to control a motor of said belt and the speed thereof as a function of said weight, whereby a microcake of less than 1 mm thickness of fine and coagulated solids is formed and retained on the surface of said belt thereby improving the filtering capacity of said belt;

a water collection body being provided under said first location for water passing through said belt perforations, and a solids collection bin being provided at said second location, for collection of particles falling off said belt at said second location.

In a preferred embodiment of the present invention, there is provided a multi-stage apparatus for continuous waste water filtration as described above, wherein said second tank has the form of an inverted truncated prism.

In a most preferred embodiment of the present invention, there is provided a multi-stage apparatus for continuous waste water filtration as described above, wherein said perforated belt passes through a water bath at said second location.

In a specially preferred embodiment of the present invention, there is provided a multi-stage apparatus for continuous waste water filtration wherein said second tank is further provided with a skimmer for removing floating, suspended solids from the surface of water contained therein.

In other preferred embodiments of the present invention, said multi-stage apparatus further comprises a metering pump to mix a coagulant into waste water introduced into said first tank, said tank being also provided with an impeller immersed in said waste water.

The invention also provides a method for continuous waste water filtration, comprising the following steps:

(a) feeding waste water containing suspended solids into a first tank;

(b) adding a coagulant to said waste water;

(c) mixing the coagulant into said waste water in said first tank;

(d) feeding the resultant mixture into a sloped-bottom second tank;

(e) periodically discharging accumulated solids from said second tank by opening a lower door therein;

(f) arranging the partially-cleared water to overflow an upper weir of said second tank, so as to fall onto a perforated continuously-driven, non-taut perforated belt, having a surface positioned to receive, at a first location, a stream of said discharged, partially-cleared water, the belt perforations being sized to enable the passage of clear water therethrough while retaining fine and coagulated solids on said surface for subsequent discharge at a second location, and said belt being non-taut to form a trough for retaining a body of water above the surface thereof;

(g) providing a load sensor in contact with said belt to determine the combined weight of said belt and the water retained thereon and to control a motor of said belt and the speed thereof as a function of said weight, whereby a microcake of less than 1 mm thickness of fine and coagulated solids is formed and retained on the surface of said belt thereby improving the filtering capacity of said belt;

(h) collecting water which has been filtered by said moving belt; and (i) removing solid particles from the surface and perforations of said moving belt. .

In a preferred embodiment of the present invention said body of water has a depth of between 2 cm and 10 cm at its area of greatest depression.

In an especially preferred embodiment of the present invention said microcake is maintained at a thickness of about 0.04 to 0.06 mm.

It will thus be realized that the novel apparatus and method of the present invention results in the formation of a thin layer of a microcake formed from the fine and coagulated solids which are retained on the surface said moving belt thereby improving the filtering quality of the system due to the partial clogging of the belt by the coagulated floc.

In U.S. Pat. No. 5,178,173 to Kerlin et al., U.S. Pat. No. 5,080,806 to Balzano, U.S. Pat. No. 3,959,133 to Fulton, and British Patent No. 2,172,216 there are described a sequence of coagulation/flocculation settling and filtration, however these references do not teach or suggest a filtration step being performed by a belt filter.

In U.S. Pat. No. 3,537,584 to MacDonald and U.S. Pat. No. 2,173,256 to Jordan there are described belt filters however said references do not teach or suggest a continuously-driven, non-aut perforated belt, having a surface positioned to receive, at a first location, a stream of discharged, partially-cleared water, the belt perforations being sized to enable the passage of clear water therethrough while retaining fine and coagulated solids on said surface for subsequent discharge at a second location, and said belt being non-taut to form a trough for retaining a body of water above the surface thereof in combination with a load sensor in contact with said belt to determine the combined weight of said belt and the water retained thereon and to control a motor of said belt and the speed thereof as a function of said weight, whereby a microcake of less than 1 mm thickness of fine and coagulated solids is formed and retained on the surface of said belt thereby improving the filtering capacity of said belt.

A complete system for water purification contains additional components such as storage ponds for use as buffers, facilities for drying and processing solid wastes, a chlorination station, and additional optional facilities such as injectors for adding oxygen to the water, a device for softening the water by the cold lime process, and other equipment required for compliance with the particular water quality standards in force, depending on the purpose for which the processed water is required. Such components are known in the art, and are not part of the present invention.

In U.S. Pat. No. 5,1657,821 there is disclosed a method for thickening and dewatering slurry sludge, including the steps of adding a coagulant to the sludge, stirring the resulting mixture, filtering the flock on a moving filtering bed, removing filtrate, cleaning the filter bed by means of a spray, and removing flock from the belt by means of a scraper.

U.S. Pat. Nos. 4,707,272; 4,358,381; 4,078129; 4,110,209; 4,309,291 and 2,361,283 all describe methods of filtering slurries and purification of waste water; however, said patents neither teach nor suggest the specific method and apparatus of the present invention.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
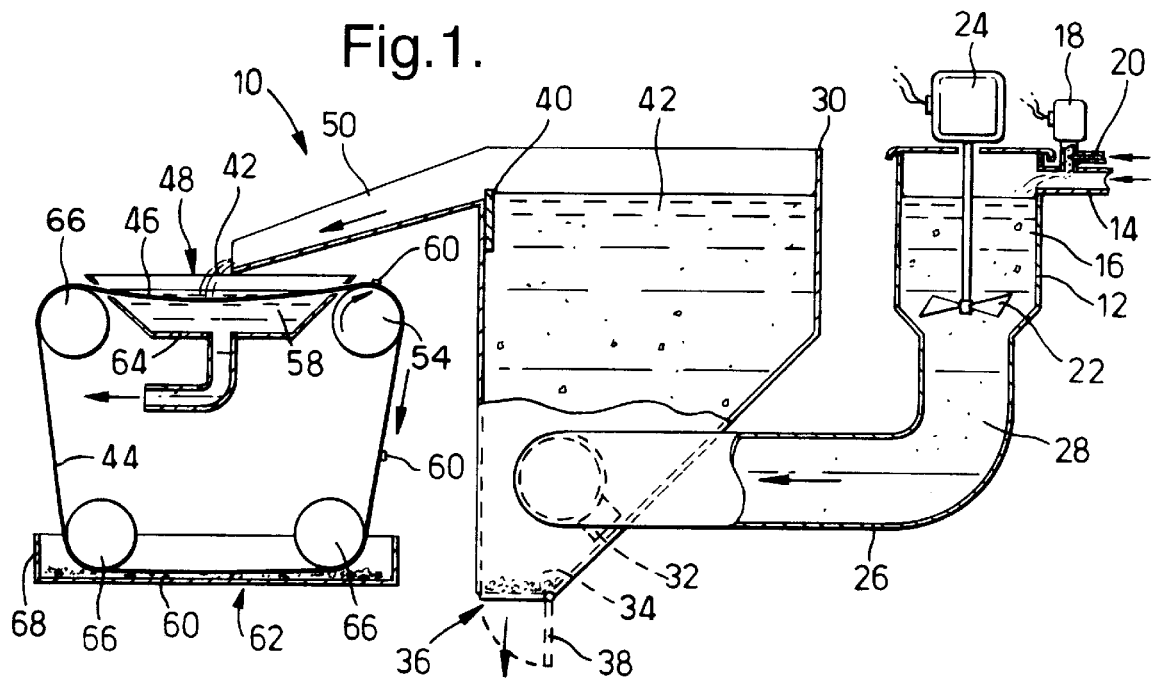
FIG. 1 is a diagrammatic view of a preferred embodiment of the apparatus according to the invention.

A first tank 12 is provided with a waste water inlet pipe 14 arranged to supply thereto waste water 16 containing suspended solids. First tank 12 is further provided with a metering pump 18 to mix coagulant 20 into the waste water 16 introduced therein. Addition of the coagulant 20 enhances the efficiency of operation of the following stages.

Coagulant 20 may suitably be selected from the group consisting of alum, ferric chloride, ferric sulfate, ferrous sulfate, $TiO_2$, lime, and polyacrylates such as cationic PAM, cationic polyamine, cationic resin amine and anionic PAM.

First tank 12 is provided with an impeller 22 immersed in the waste water 16, sufficient power being applied to impeller 22 by motor 24 to ensure even distribution of the coagulant 20. Tank 12 is provided with outlet pipe 26 for feeding the resultant mixture 28 to the next stage.

A second tank 30 receives mixture 28 from a long distributor outlet 32 fitted to the end of outlet pipe 26. Tank 30 is sufficiently large to allow settling of the larger solids 34. At least one lower, openable port 36 is provided for periodic, short-time discharge of these solids 34, together with a limited volume of mixture 28. The weight of mixture 28 pressing on solids 34 facilitates the discharge through port 36, as well as flushing of door 38, which covers port 36. It is important to note that the discharge action is achieved using only the small amount of energy required for the opening and closing of the door 38.

Tank 30 has an upper weir 40 for discharge of partially-cleared water 42. Such discharge could be alternatively achieved through an outlet port or screen, however, the weir 40 has the important advantage of being uncloggable and yet tends to restrain floating solids and prevent their discharge to the next stage, provided that moderate flow rates are used.

A continuously driven, perforated belt 44 has a surface 46 positioned to receive at a first location 48 a stream of discharged partially cleared water 42. The water 42 may come directly from the weir 40, but in the embodiment shown, a fluid flow channel 50 is provided for this purpose.

Advantageously, belt 44 is driven by pulley 54 in the direction shown, resulting in belt sag 52 at the first location 48. The water 42 being discharged onto the belt 44 at the first location 48 will thus be held and filtered over a large belt area.

Figure 2:
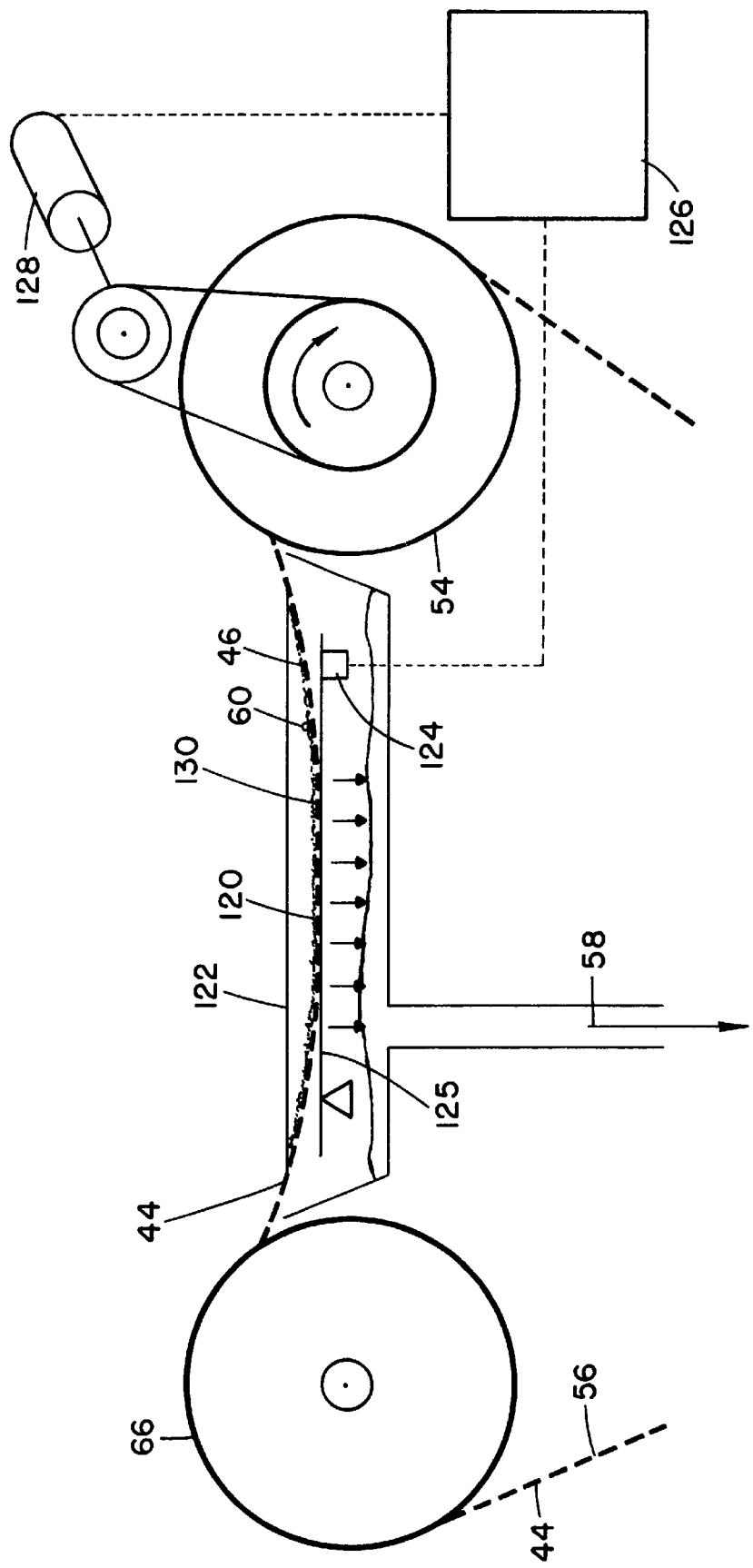
FIG. 2 is a diagrammatic view of the belt speed control system used in the same embodiment.

As seen more clearly in FIG. 2, the belt 44 is non-taut and forms a trough 120 for retaining a body of water 122 above the surface 46. A load sensor 124 is in contact with the belt 44 and determines the combined weight of part of the belt 44 and the body of water 122 retained thereon, as well as any solids 60 on the belt 44. Sensor 124 is functionally connected to a motor controller 126, which sets the speed of a motor 128 as a function of such weight. Motor speed is thus arranged to suit the formation of a microcake 130 of fine coagulated solids less than 1 mm thick. The belt surface 46 being thus covered improves the filtering capacity of the belt 44.

Figure 3:
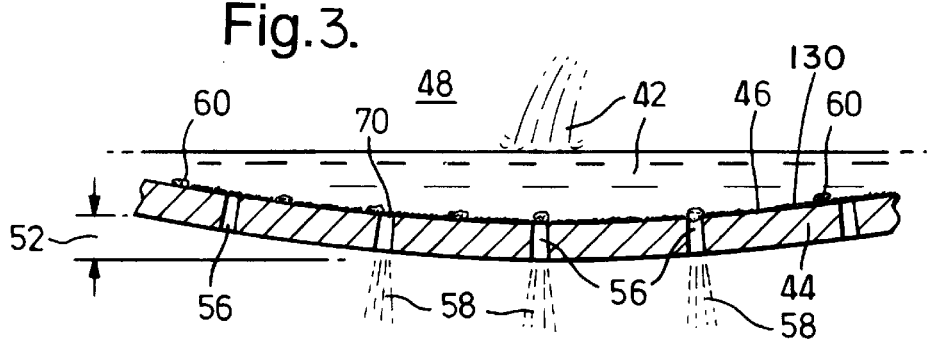
FIG. 3 is an enlarged view of the perforated belt as it appears in a first location.
Figure 4:
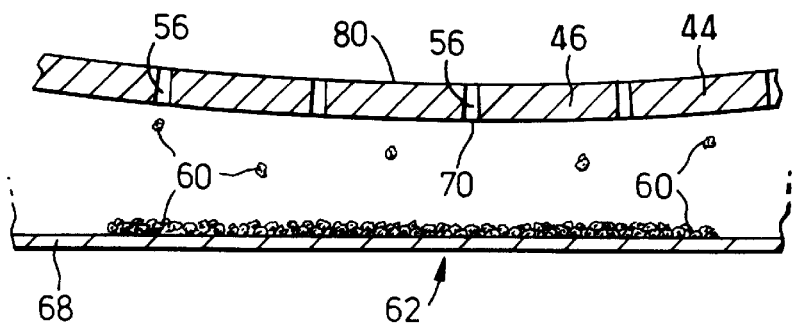
FIG. 4 is an enlarged view of the perforated belt as it appears in a second location.

Belt perforations 56, seen in FIG. 3, are sized to enable the passage of clear water 58 therethrough while retaining fine solids 60 in the microcake 130 on the surface 46 for subsequent discharge at a second location 62, seen in detail in FIG. 4, positioned in this embodiment underneath the first location 48.

A water collection trough 64 is provided under the first location 48, for water 58 passing through the belt perforations 56. Three moderately-sized idler pulleys 66 are shown in FIG. 1, which determine the belt path of travel. Where large diameter pulleys (not shown) are to be used, one idler pulley will suffice.

A solids collection bin 68 is provided under the second location 62, for collection of microcake 130 falling off the belt 44.

FIG. 3 shows an enlarged view of one of the belt perforations 56 as it appears when the belt is in the first location 48. As seen, the entrance 70 to the perforation 56 is somewhat reduced on the side of the surface 46 due to belt sag, thus inhibiting the passage of a solid particle 60 which is about the same diameter as perforation 56. This configuration should be compared to that seen in FIG. 4, where, in the second location, any belt sag tends to open the perforation entrance 70, which now faces downwards. Consequently, a solid particle 60 previously trapped in the entrance 70 to the perforation will tend to be released at second location 62.

Further means for removing waste solid particles from belt 44 will be described below with reference to FIG. 6.

Referring again to FIG. 2, the body of water 122 has a depth, measured at its area of greatest depression, of between 2 cm and 10 cm. The thickness of the microcake is advantageously maintained in the range of 0.04 to 0.06 mm.

Figure 5:
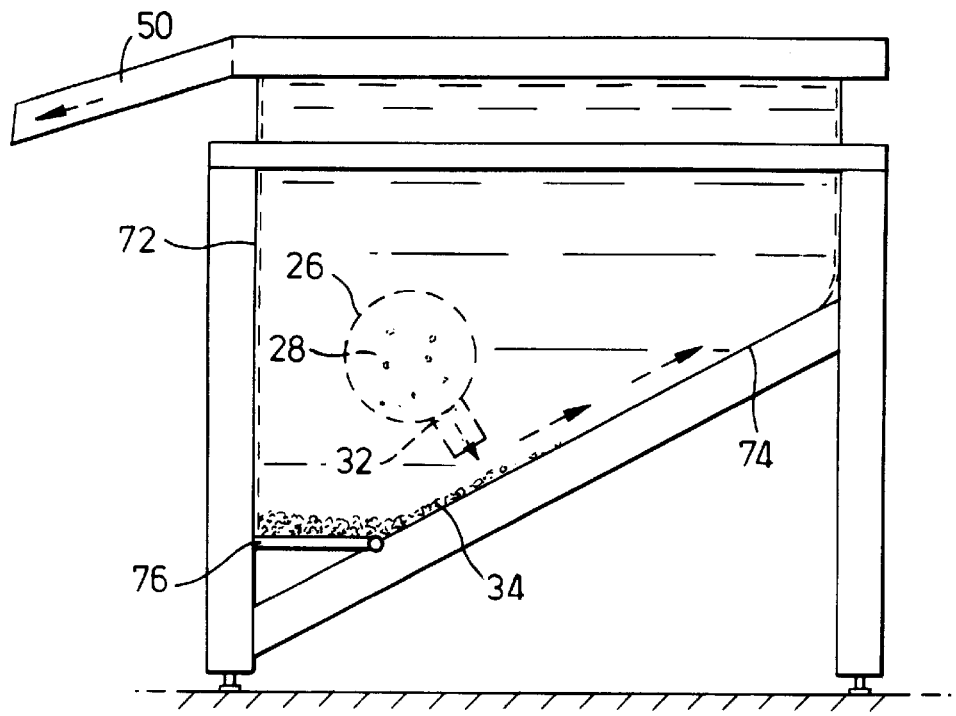
FIG. 5 is a diagrammatic view of a truncated, prismatic tank used for separation of larger solids.

Referring now to FIG. 5, there is seen a preferred embodiment of a second tank 72, which has the form of an inverted, truncated triangular prism. Tank 72 receives the mixture 28 from a long distributor outlet 32 fitted to the end of outlet pipe 26, whereby flow velocity is reduced to prevent disturbing the settling operation taking place in tank 72. The distributor outlet 32 is arranged to discharge in the direction of one of the lower sloping walls 74. Water inside tank 72 flows slowly upwards along wall 74, and larger solids 34, which have been acted on by the coagulant 20, slide downwards towards the door 76.

Figure 6:
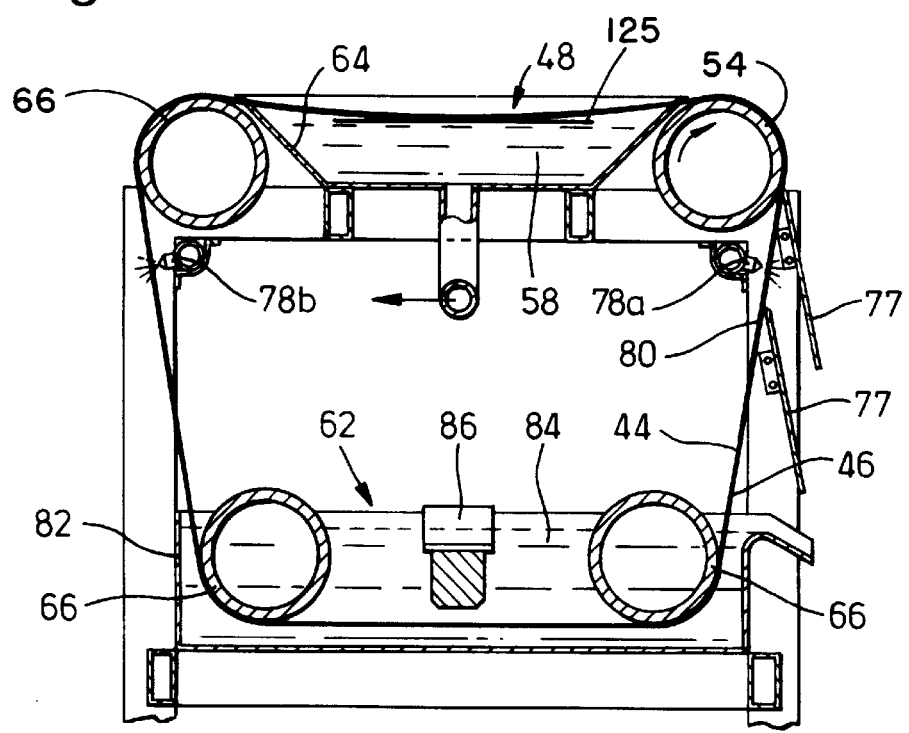
FIG. 6 is a sectioned, front view of the perforated belt, provided with various cleaning means.

FIG. 6 shows a preferred embodiment of a perforated belt 44, provided with cleaning means. Two scrapers 77 are in contact with the belt 44 to remove waste solids from the surface 46. A row of spray jets 78a is positioned to spray a fluid, air stream or water, at the inner face 80 of belt 44 for the removal of solids 60 from perforations 56, as seen in FIG. 3. An optional, second row of spray jets 78b is shown underneath the pulley 54. The jets 78b act to remove any solid particles which may still cling to the belt 44 after it has passed the second location 62. Jets 78a, 78b require considerable energy for their operation and are intended for use only under circumstances when the other means provided, such as the water bath 82, do not sufficiently clear the perforations.

Perforated belt 44 passes through a water bath 82 at the second location 62. Advantageously, the water 84 in the bath 82 is continuously changed. The water 84 may be heated and/or have a detergent added to increase its effectiveness.

At least one ultra-sonic wave generator 86 is immersed in the bath 82, to loosen solid particles from the perforations.

Figure 7:
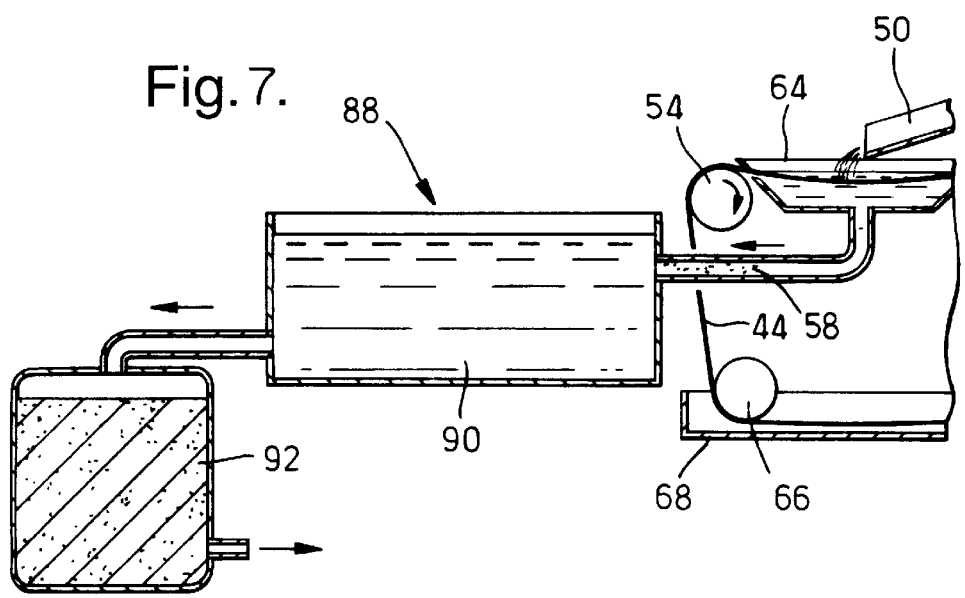
FIG. 7 is a diagrammatic view of an apparatus arranged to produce high quality water.

FIG. 7 depicts a multi-stage apparatus 88 for continuous waste water filtration, similar to apparatus 10 but arranged to produce water of improved quality, for example, water for the irrigation of crops for human consumption. Apparatus 88 is further provided with a settling tank 90, arranged to receive water 58 previously filtered by perforated belt 44. Where water of still better quality is needed, such as that required for domestic use, water previously filtered by the settling tank 90 is pumped into a fine sand filter 92. As almost all contaminating solids have been previously removed, filter 92 may be used for an extended period of time without needing replacement.

Figure 8:
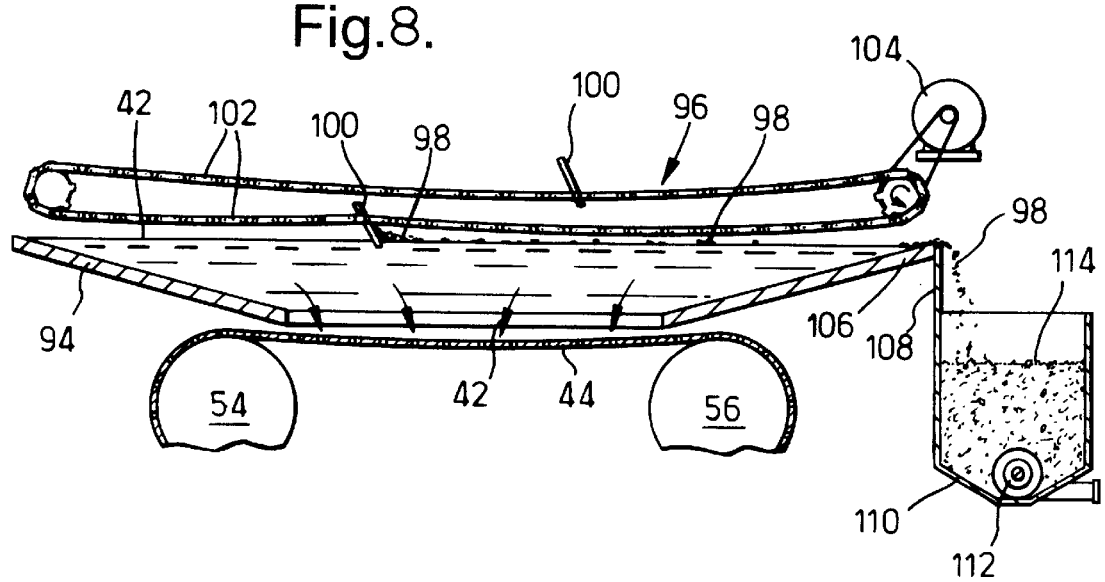
FIG. 8 is a diagrammatic view of a second tank, provided with a skimmer for removing floating solids There is seen in FIG. 1 a multi-stage apparatus 10 for continuous waste water filtration.

FIG. 8 is a diagrammatic view of a second tank 94, provided with a skimmer device 96 for removing floating, suspended solids 98 from the surface of water 42 contained therein.

Skimmer device 96 is suspended above the tank 94, and comprises at least one floating sludge skimmer blade 100, which is partially immersed in the water 42 and is driven in a horizontal direction by means of a chain 102, which in turn is driven by an electric drive unit 104. In the embodiment shown, the drive unit 104 operates continuously in the same direction and has several skimmer blades 100 which move floating solids 98 over a weir blade 106 and over the wall 106 of tank 94 into sludge pan 110.

In a further embodiment (not shown), the drive unit is arranged to reciprocate the chain, reciprocation control being achieved by limit switches positioned near the walls of the tank.

A sludge pump 112, such as the screw conveyor shown, transfers the accumulated sludge 114 from sludge pan 110 to further processing.

Skimmer device 96 greatly reduces the load of solids on the continuously-driven, perforated belt 44, which receives a stream of discharged, partially cleared water 42 from the second tank 94. Thereby, the perforated belt 44 has an increased water throughput and the belt 44 is easier to keep clean.

The invention also provides a method for continuous waste water filtration, comprising the following steps:

(a) feeding waste water containing suspended solids into a first tank;

(b) adding a coagulant to said waste water;

(c) mixing the coagulant into said waste water;

(d) feeding the resultant mixture into a sloped-bottom second tank;

(e) periodically discharging accumulated solids from said second tank by opening a lower door therein;

(f) arranging the partially-cleared water to overflow an upper weir of said second tank, so as to fall onto a perforated moving belt to achieve filtering;

(g) collecting water which has been filtered by said moving belt; and (h) removing solid particles from the surface and perforations of said moving belt.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multi-stage apparatus for continuous waste water filtration, comprising:

a first tank provided with a waste water inlet pipe to supply waste water containing suspended solids to said tank, means for adding a coagulant to said waste water and an outlet pipe;

a second tank receiving said mixture of waste water and coagulant from the outlet pipe, said second tank being sufficiently large to allow larger suspended solids to settle and being provided with a lower, openable port for discharge of said settled solids and having an upper weir for discharge of partially-cleared water;

a continuously-driven, non-taut perforated belt, having a surface positioned to receive, at a first location, a stream of said discharged, partially-cleared water, the belt perforations being sized to enable the passage of clear water therethrough while retaining fine and coagulated solids on said surface for subsequent discharge at a second location, and said belt being non-taut to form a trough for retaining a body of water above the surface thereof;

a load sensor in contact with said belt to determine the combined weight of said belt and the water retained thereon and to control a motor of said belt and the speed thereof as a function of said weight, whereby a microcake of less than 1 mm thickness of fine and coagulated solids is formed and retained on the surface of said belt thereby improving the filtering capacity of said belt;

a water collection body being provided under said first location for water passing through said belt perforations, and a solids collection bin being provided at said second location, for collection of particles falling off said belt at said second location.

2. A multi-stage apparatus according to claim 1 wherein said body of water has a depth of between 2 cm and 10 cm at its area of greatest depression.

3. A multi-stage apparatus according to claim 1 wherein said microcake is maintained at a thickness of about 0.04 to 0.06 mm.

4. A multi-stage apparatus for continuous waste water filtration as claimed in claim 1, wherein said second tank has the form of an inverted truncated prism.

5. A multi-stage apparatus for continuous waste water filtration as claimed in claim 1, wherein at least one scraper for removing waste solids is in contact with said belt.

6. A multi-stage apparatus for continuous waste water filtration as claimed in claim 1, wherein at least one spray jet for spraying a fluid is positioned at said belt for the removal of waste solids therefrom.

7. A multi-stage apparatus for continuous waste water filtration as claimed in claim 1, wherein at least one spray jet for spraying compressed air is positioned at said belt for the removal of waste solids therefrom.

8. A multi-stage apparatus for continuous waste water filtration as claimed in claim 1, wherein at least one spray jet for spraying steam is positioned at said belt for the removal of waste solids therefrom.

9. A multi-stage apparatus for continuous waste water filtration as claimed in claim 1, wherein said perforated belt passes through a water bath at said second location.

10. A multi-stage apparatus for continuous waste water filtration as claimed in claim 9, wherein the water in said water bath is continuously removed therefrom.

11. A multi-stage apparatus for continuous waste water filtration as claimed in claim 9, wherein at least one ultrasonic wave generator is immersed in said water bath.

12. A multi-stage apparatus for continuous waste water filtration as claimed in claim 1, wherein said second tank is further provided with a skimmer for removing floating, suspended solids from the surface of water contained therein.

13. A multi-stage apparatus for continuous waste water filtration as claimed in claim 1, wherein said coagulant is added into said first tank by a metering pump, said first tank further comprising an impeller immersed in said waste water.

14. A multi-stage apparatus for continuous waste water filtration as claimed in claim 1, further comprising a settling tank arranged to receive water previously filtered by said belt.

15. A multi-stage apparatus for continuous waste water filtration as claimed in claim 14, further comprising a fine sand filter receiving water previously settled by said settling tank.

16. A method for continuous waste water filtration, comprising the following steps:

(a) feeding waste water containing suspended solids into a first tank;

(b) adding a coagulant to said waste water;

(c) mixing the coagulant into said waste water in said first tank;

(d) feeding the resultant mixture into a sloped-bottom second tank;

(e) periodically discharging accumulated solids from said second tank by opening a lower door therein;

(f) arranging the partially-cleared water to overflow an upper weir of said second tank, so as to fall onto a perforated continuously-driven, non-taut perforated belt, having a surface positioned to receive, at a first location, a stream of said discharged, partially-cleared water, the belt perforations being sized to enable the passage of clear water therethrough while retaining fine and coagulated solids on said surface for subsequent discharge at a second location, and said belt being non-taut to form a trough for retaining a body of water above the surface thereof;

(g) providing a load sensor in contact with said belt to determine the combined weight of said belt and the water retained thereon and to control a motor of said belt and the speed thereof as a function of said weight, whereby a microcake of less than 1 mm thickness of fine and coagulated solids is formed and retained on the surface of said belt thereby improving the filtering capacity of said belt;

(h) collecting water which has been filtered by said moving belt; and (i) removing solid particles from the surface and perforations of said moving belt.

* * * * *